(12) United States Patent
Demma

(10) Patent No.: US 8,687,196 B2
(45) Date of Patent: Apr. 1, 2014

(54) COMPOSITE PANEL HAVING INTEGRATED RAIN SENSOR

(75) Inventor: Dino Demma, Ruesselsheim (DE)

(73) Assignee: GM Global Technology Operations LLC, Detroit, MI (US)

( * ) Notice: Subject to any disclaimer, the term of this patent is extended or adjusted under 35 U.S.C. 154(b) by 100 days.

(21) Appl. No.: 13/264,127

(22) PCT Filed: Jan. 27, 2010

(86) PCT No.: PCT/EP2010/000452
§ 371 (c)(1),
(2), (4) Date: Oct. 12, 2011

(87) PCT Pub. No.: WO2010/118794
PCT Pub. Date: Oct. 21, 2010

(65) Prior Publication Data
US 2012/0033222 A1  Feb. 9, 2012

(30) Foreign Application Priority Data

Apr. 14, 2009  (DE) .......................... 10 2009 017 385

(51) Int. Cl.
*G01N 21/55* (2006.01)

(52) U.S. Cl.
USPC .......................................... 356/445; 356/442

(58) Field of Classification Search
USPC .................. 356/445–446, 448, 432–435, 442;
250/227.24, 573, 574, 216, 200,
250/227.11; 340/602, 603, 604; 439/50, 68,
439/71, 78, 82, 571; 361/760; 174/266,
174/261; 257/118, 684, 88, 99, 737, 741,
257/779, 783, E25.02, E33.057; 438/455,
438/458

See application file for complete search history.

(56) References Cited

U.S. PATENT DOCUMENTS

| 6,768,099 | B1 | 7/2004 | Cheng et al. |
| 7,745,838 | B2 * | 6/2010 | Lefevre ........................ 257/88 |
| 2008/0212101 | A1 | 9/2008 | Wolf et al. |

FOREIGN PATENT DOCUMENTS

| DE | 10005248 A1 | 8/2001 |
| DE | 10010599 A1 | 9/2001 |
| DE | 10241728 A1 | 3/2004 |
| DE | 10336972 A1 | 3/2005 |
| DE | 102004054465 A1 | 5/2006 |
| EP | 1437215 A1 | 7/2004 |

OTHER PUBLICATIONS

International Searching Authority, International Search Report for Application No. PCT/EP2010/000452, dated May 10, 2010.

* cited by examiner

*Primary Examiner* — Tri T Ton
(74) *Attorney, Agent, or Firm* — Ingrassia Fisher & Lorenz, P.C.

(57) ABSTRACT

A composite pane arrangement, in particular for a motor vehicle, is provided with a composite pane that includes, but is not limited to at least two panes connected with each other by an intermediate layer, and with at least one optical sensor device for the optical detection of moisture on an outer surface of the composite pane facing away from the intermediate layer. The optical sensor device is arranged between the two panes and is electrically contacted by means of transparent, laminar conductive traces.

7 Claims, 4 Drawing Sheets

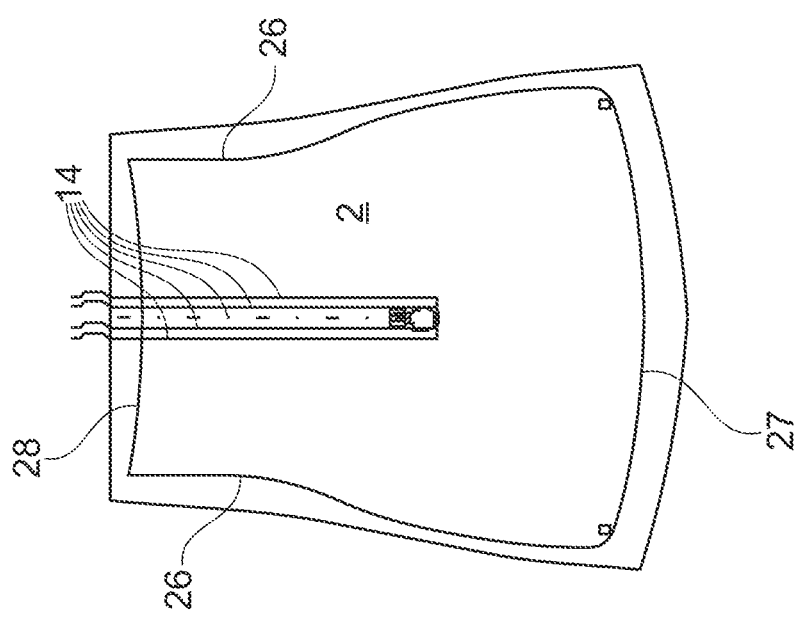
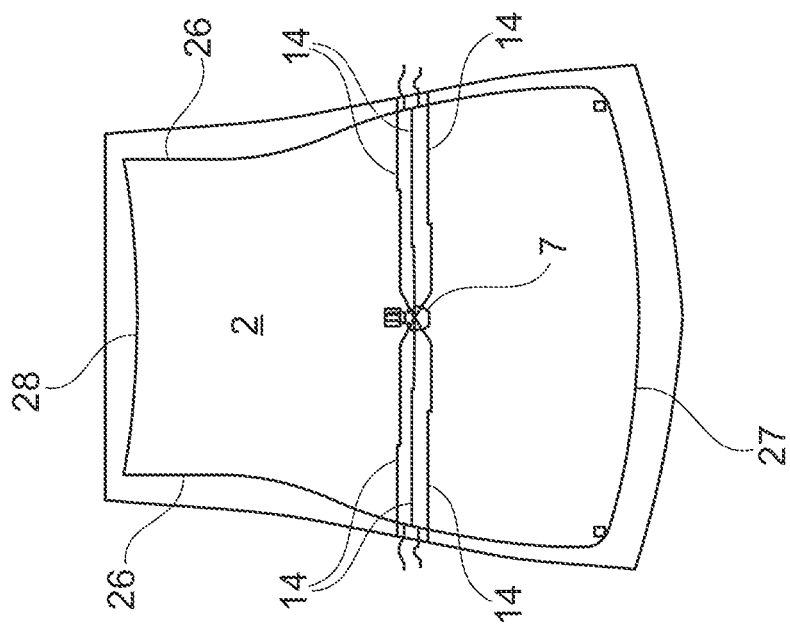

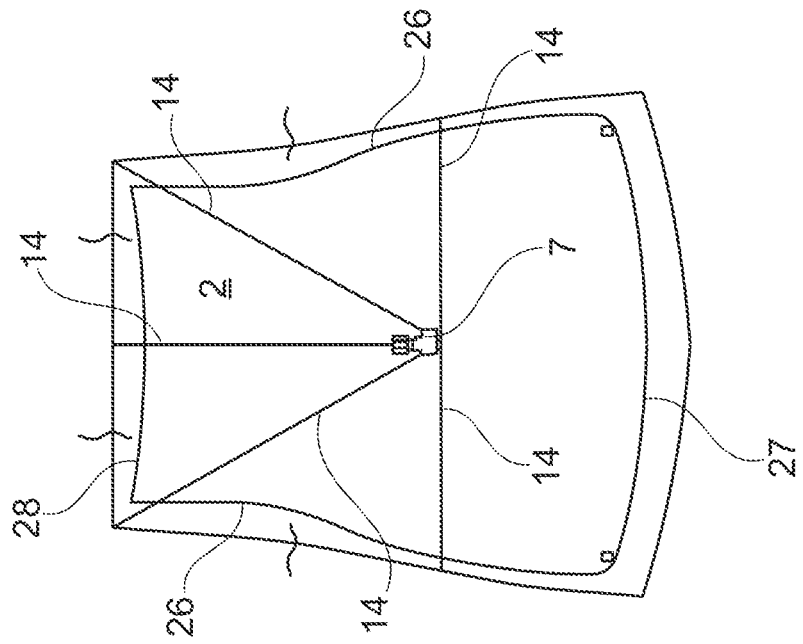
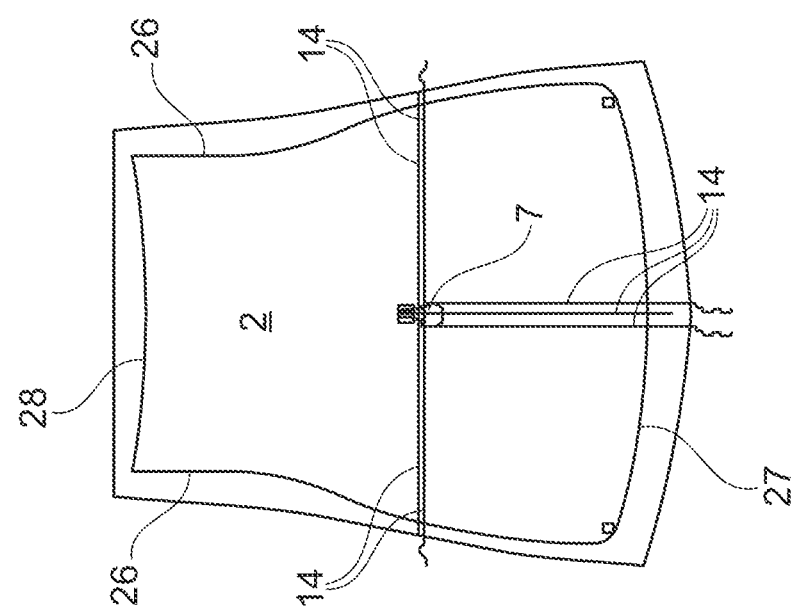

COMPOSITE PANEL HAVING INTEGRATED RAIN SENSOR

CROSS-REFERENCE TO RELATED APPLICATIONS

This application is a U.S. National-Stage entry under 35 U.S.C. §371 based on International Application No. PCT/EP2010/000452, filed Jan. 27, 2010, which was published under PCT Article 21(2) and which claims priority to German Application No. 102009017385.4, filed Apr. 14, 2009, which are all hereby incorporated in their entirety by reference.

TECHNICAL FIELD

The technical field relates to a composite pane arrangement, in particular for motor vehicles, with a composite pane and with at least one optical sensor device to detect moisture on an outer surface of the composite pane.

BACKGROUND

Modern motor vehicles are frequently equipped with an optical sensor device to detect moisture on an outer surface of the glass windshield, which is coupled with a control device for controlling a windshield wiper system of the glass windshield so that the wiping processes are able to be controlled automatically as a function of the degree of wetting of the glass windshield. Such optical sensor devices—generally designated as "rain sensors"—are used in practice in numerous variants and have already been described in many cases in the patent literature. They are based on the fundamental principle that the glass windshield serves as an optical waveguide. The light generated from an optical transmitter is coupled in on the inner side of the pane facing the passenger compartment and after total reflection on the outer side of the pane, facing away from the passenger compartment, is coupled out on the inner side of the pane and is picked up by an optical receiver. Depending on the degree of wetting of the outer surface of the glass windshield, which involves a change to the refractive index for the pane/air transition of the outer side of the pane, the proportion of the reflected light varies, so that indirectly a conclusion can be drawn as to the quantity of fluid or respectively the degree of wetting on the outer surface of the glass windshield.

On the one hand, rain sensors must be arranged in the wiping field of the glass windshield, but on the other hand they must at least not substantially impair the clear visibility for the driver. Usually, rain sensors are mounted for this purpose in the region of the interior rear-view mirror on the inner side of the glass windshield. In addition, in this case, the portion of the electric leads situated in the region of the glass windshield for supplying the rain sensor with electric power and for signal transmission to the control arrangement of the windshield wiper system can be kept relatively short.

In motor vehicles with composite panes, which typically have an outer and inner pane with an intermediate layer of, for example, polymer material, the light is coupled in on the inner side of the composite pane facing the passenger compartment, passes through the intermediate layer, and after total reflection on the outer side of the outer pane is coupled out again on the inner side of the composite pane.

In contrast, at least one object is to provide an improved composite pane arrangement. In addition, other objects, desirable features and characteristics will become apparent from the subsequent summary and detailed description, and the appended claims, taken in conjunction with the accompanying drawings and this background.

SUMMARY

A composite pane arrangement, in particular for motor vehicles, is shown. The composite pane arrangement comprises a composite pane which consists of at least two for example glass panes, which are connected with each other by an intermediate layer consisting for example of polymer material. In a motor vehicle, these are an inner pane arranged on the passenger compartment side and an outer pane, delimiting the composite pane towards the environment, which are connected to the composite pane via the intermediate layer. It further comprises at least one optical sensor device for the optical detection of moisture on an outer surface of the composite pane facing away from the intermediate layer. It is essential here that the optical sensor device is arranged between the two panes and is contacted electrically by means of transparent, laminar conductive traces. The optical sensor device comprises for this purpose an optical transmitter for the generation of light, and if applicable a light coupling-in element associated with the transmitter, through which the generated light can be coupled in in a suitable manner directly into the pane of which the wetting is to be detected. It further comprises an optical receiver for the detection of radiation reflected on the outer surface of the composite pane, and if applicable a light coupling-out element associated with the receiver, through which the generated light can be coupled out in a suitable manner from the pane of which the wetting is to be detected. Furthermore, the optical sensor device typically comprises an evaluation unit for the evaluation of electronic signals of the optical detector, the output signals of which, for example in a motor vehicle, can be fed to a control arrangement for controlling the windshield wiper system of a glass windshield. The evaluation unit can be integrated in particular into such a control arrangement.

The transparent, laminar conductive traces have an electrically conductive material, such as for example a thin layer of a metallic material vapor-deposited onto the intermediate layer, or a polymer material which is made to be conductive by the addition of a metallic material. In particular here, this can be a transparent, conductive oxide on the basis of oxidic semiconductors with a low specific resistance, for example indium tin oxide ($In_2O_3$:$SnO_2$), aluminum tin oxide (ZnO:Al) and fluorine tin oxide ($SnO_2$:F).

In terms of this description, the expression "light" comprises electromagnetic radiation which can also lie outside the visible wavelength range.

By the composite pane arrangement, it can be achieved in an advantageous manner that light is coupled in directly into the pane on the other surface of which the wetting is to be detected. In the motor vehicle, this is the outer surface of the composite pane. In an advantageous manner, it can hereby be avoided that the light passes through the other pane (inner pane in the motor vehicle) of the composite pane and the intermediate layer, so that the measurement accuracy owing to unavoidable optical non-homogeneities and random imperfections can be improved. In a particularly advantageous manner, the clear visibility for the driver is not impaired due to the transparent, laminar conductive traces for the electrical contacting of the optical sensor device. It is therefore possible to guide the transparent conductive traces in any desired manner onto one or several edges of the composite pane.

In an embodiment of the composite pane arrangement, the optical sensor device is arranged in a recess or respectively depression of the intermediate layer which is open towards the outer surface of the composite pane. Through this step, the composite pane arrangement can be produced in a particularly simple manner, without substantially impairing the structure of the composite pane.

In a further embodiment of the composite pane arrangement, the transparent, laminar conductive traces for the contacting of the optical sensor device are applied on a surface of the intermediate layer, which makes possible a particularly simple producability of the conductive traces. Thus, the conductive traces can be produced for example by laminar coating of the intermediate layer with conductive material, for example by vapor deposition and subsequent forming of the conductive traces by selective removal of conductive material. The transparent conductive traces can be formed in particular on the surface of the intermediate layer which faces the outer surface of the composite pane, the wetting of which is to be detected. This facilitates the electrical contacting of the optical sensor device, because the transparent conductive traces can be guided in a simple manner up to the optical sensor device. However, it is also equally possible that the transparent conductive traces are formed on the surface of the intermediate layer which faces away from the outer surface of the composite pane, the wetting of which is to be detected. In this case, the optical sensor device can be connected electrically via electric bridges, for example contact pins, within the intermediate layer with the transparent conductive traces. It would also be conceivable to provide the intermediate layer for example with through-openings, which are filled with a transparent electrical material.

In a further embodiment of the composite pane arrangement, the above-mentioned evaluation unit for the evaluation of electronic signals of the optical receiver is arranged outside the composite pane. Through this step, the part of the optical sensor device, arranged in the region of the composite pane, consisting substantially of the optical transmitter and optical receiver, is configured so as to be relatively small in its dimensions. In particular in this case, the optical sensor device can also be placed in the field of vision of the driver of a motor vehicle, without substantially impairing the visibility.

According to a further embodiment of the composite pane arrangement in a motor vehicle, it can be advantageous if the optical sensor device is arranged in the vicinity of an interior rear-view mirror of the motor vehicle. In particular in this case, it can be advantageous furthermore if the transparent conductive traces are guided to the lateral edges and/or to an upper edge and/or to a lower edge of the composite pane, whereby electrical conductive connections between the optical sensor device and a voltage source (car battery, for example) for the supply of the sensor device with electrical power and/or of the evaluation unit for the evaluation of electrical signals of the optical receiver can be kept short, in order to save material and costs in an advantageous manner in industrial mass production.

According to a further embodiment of the composite pane arrangement, the composite pane extends in the form of a so-called "panoramic pane" up to a roof crossmember connecting the two opposite B-columns of a vehicle body with each other. In this case, a non-visible, electrical contacting of the optical sensor device through the transparent, laminar conductive traces is particularly advantageous.

A motor vehicle is also provided that is equipped with at least one composite pane arrangement as described above.

BRIEF DESCRIPTION OF THE DRAWINGS

The present invention will hereinafter be described in conjunction with the following drawing figures, wherein like numerals denote like elements, and:

FIGS. 3A-3D are diagrammatic perspective views of the composite pane of the composite pane arrangement of FIG. 1 to illustrate different example variants of the transparent conductive traces for the contacting of the optical sensor device.

DETAILED DESCRIPTION

The following detailed description is merely exemplary in nature and is not intended to limit application and uses. Furthermore, there is no intention to be bound by any theory presented in the preceding background or summary or the following detailed description.

Figure 1:
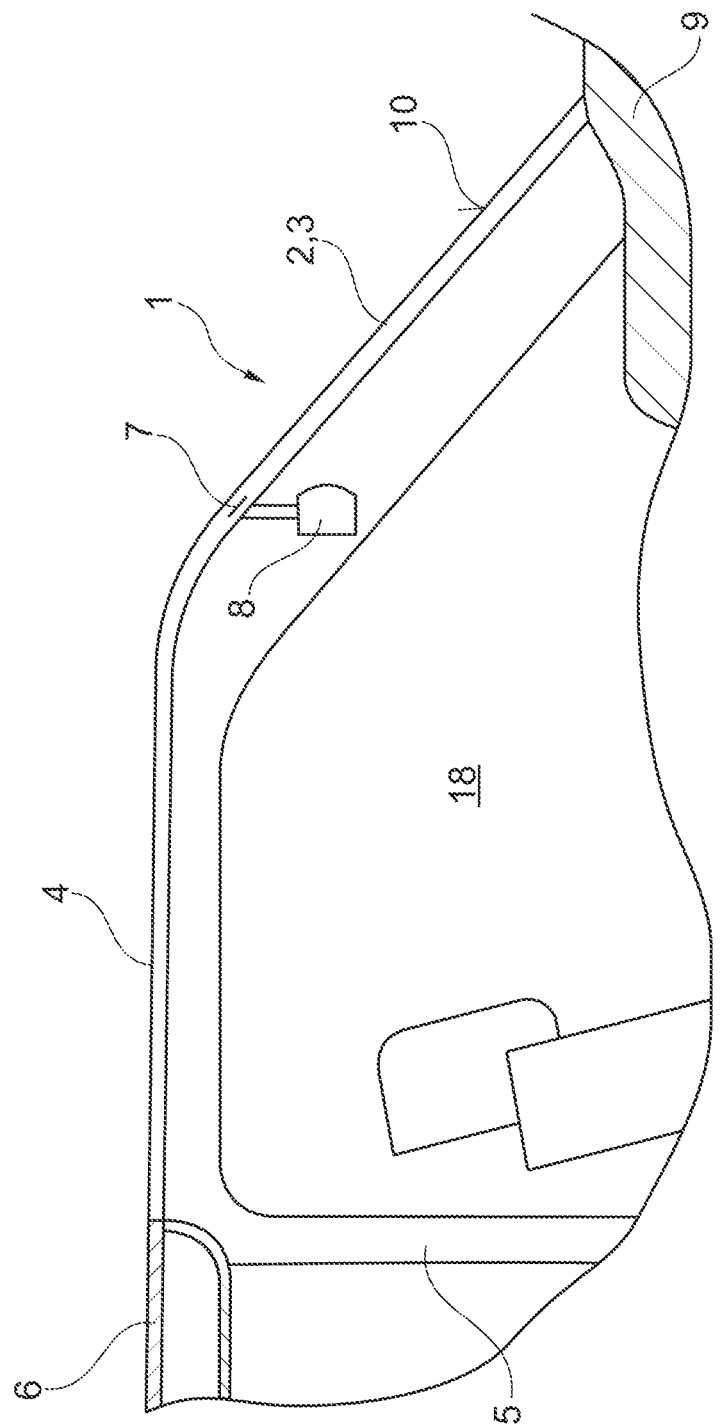
FIG. 1 is a diagrammatic sectional view in the longitudinal direction of the vehicle of a composite pane arrangement of a motor vehicle according to an embodiment.

In FIG. 1 a composite pane arrangement of a motor vehicle is illustrated, designated as a whole by the reference number 1, in a diagrammatic overview representation. Accordingly, the composite pane arrangement 1 comprises a frontal composite pane 2, serving as a windshield, which extends from a frontal body section 9 up to a roof crossmember 6 connecting the two B-columns 5 of the body with each other. The two B-columns 5 constitute, as usual, a bearing connection between the vehicle floor and the vehicle roof in the region of the middle of the passenger compartment. In this respect, the composite pane 2 can be divided into a front section 3 extending obliquely to the horizontal or respectively the roadway, and a roof section 4 extending at least approximately parallel to the horizontal or respectively the roadway. In the region of an interior rear-view mirror 8 of the motor vehicle, the composite pane arrangement 1 comprises an optical sensor for the detection of the wetting of the outer surface 10 of the composite pane 2, designated below as rain sensor 7.

Figure 2:
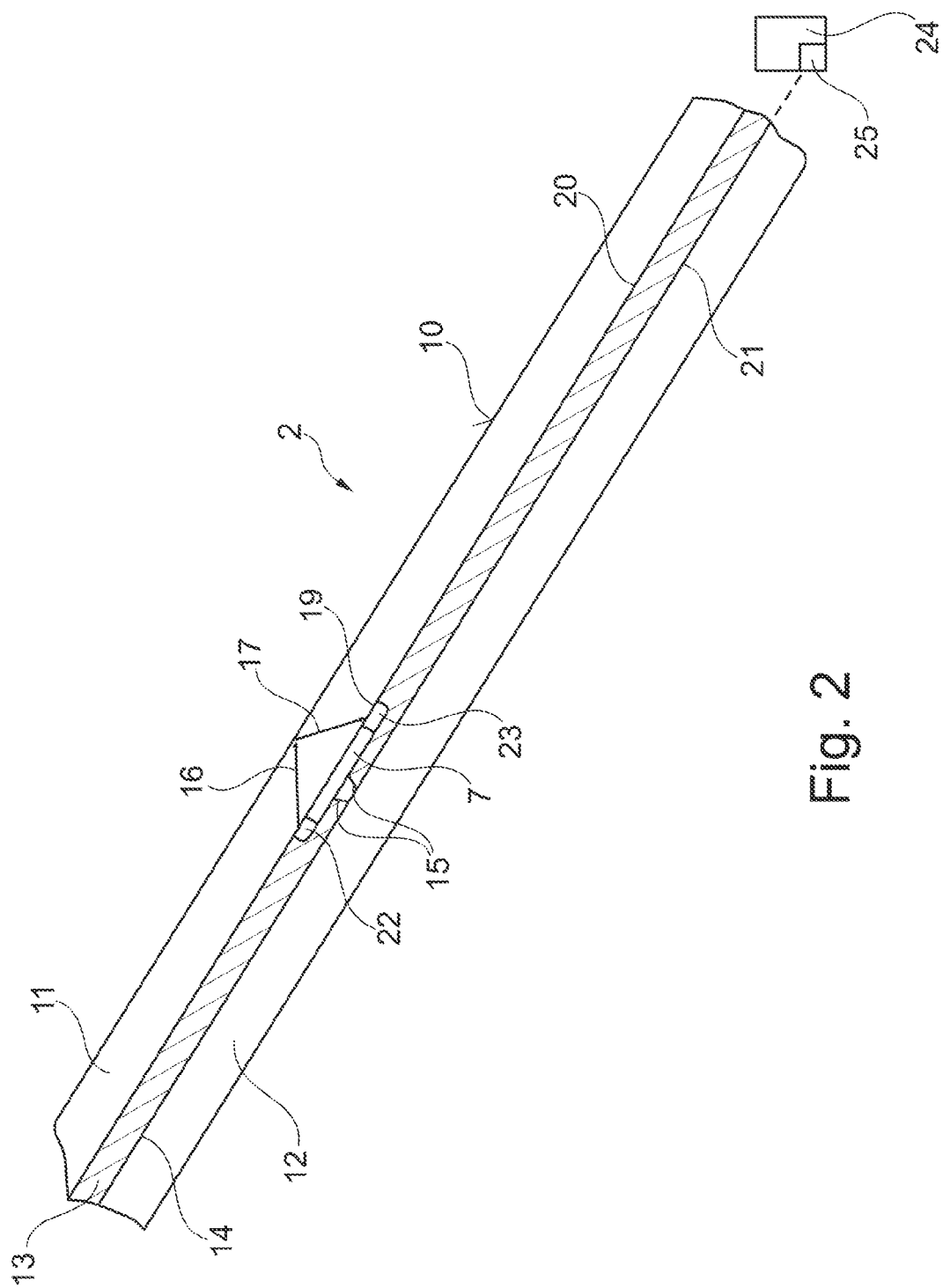
FIG. 2 is a detail view of the composite pane arrangement of FIG. 1.

In FIG. 2 the structure of the composite pane 2 is illustrated in further detail. Accordingly, the composite pane 2 comprises two glass panes, namely an outer pane 11 and an inner pane 12, by which a passenger compartment 18 of the motor vehicle is separated from the external environment. The outer and inner panes 11, 12 are connected with each other by an intermediate layer 13 of adhesive polymer material. The rain sensor 7 is arranged in the region between the outer and inner panes 11, 12 of the composite pane 2, wherein the rain sensor 7 is held in a recess 19 of the intermediate layer 13 opening towards the outer pane 11. The recess 19 is formed as a depression of a first surface 20 of the intermediate layer 13 facing the outer pane 11. On a second surface 21 of the intermediate layer 13, facing the inner pane 12, a plurality of optically transparent, laminar conductive traces 14 of an electrically conductive material are formed. An electrical connection between the rain sensor 7 and the transparent conductive traces 14 takes place through the electrical contact pins 15. Alternatively, the transparent, laminar conductive traces 14 could be formed on the first surface 20 of the intermediate layer 13, which makes the contact pins 15 dispensable.

The rain sensor 7 serves for the detection of a wetting of the outer surface 10 of the outer pane 11 of the composite pane 2 with fluid. For this purpose, the rain sensor 7 comprises an optical sensor 22 for the generation of light, which is coupled in directly into the outer pane 11 as an incident light beam 16 via a light coupling-in element which is not illustrated. An incident angle of the incident light beam 16 is selected here so that that light beam 16 is totally reflected on the outer surface 10 of the outer pane 11. The intensity of the reflected light beam 17 depends here on the wetting of the outer surface 10 of the outer pane 11. Via a light coupling-out element which is not illustrated in further detail, the reflected light beam 17 is detected by an optical receiver 23 of the rain sensor 7, which generates an electrical signal based on the received light intensity. The structure and the mode of operation of the components of such a rain sensor 7, including the light coupling-in and light coupling-out elements, are known per se to the specialist in the art, so that it is unnecessary to enter into this in further detail here.

The rain sensor 7 is connected via the transparent, laminar conductive traces 14 with a diagrammatically illustrated evaluation unit 25 for the evaluation of the electrical signals of the optical receiver, wherein the evaluation unit 25 is integrated into a diagrammatically illustrated control device 24 for the automatic control of a windshield wiper system, not illustrated in further detail, for the wiping of the composite pane 2. The control device 24 and hence the evaluation unit 25 is situated outside the composite pane 2.

The transparent, laminar conductive traces 14 consist of a transparent, conductive oxide on the basis of an oxidic semiconductor with a low specific resistance, for example indium tin oxide ($In_2O_3$:$SnO_2$). They are produced by vapor deposition of an oxide layer onto the second surface 21 of the intermediate layer 13 and subsequent selective removal of layer sections. Over the width of the laminar conductive traces 14, their electrical resistance can be set systematically. It would also be conceivable, as an alternative, to mask the second surface 21 of the intermediate layer 13, wherein the mask is left free in accordance with the desired conductive traces 14, followed by a vapor deposition of an oxide layer onto the masked second surface 21.

In FIGS. 3A-3D, different example variants are illustrated for the course of the transparent, laminar conductive traces 14. In FIG. 3A, the transparent conductive traces 14 extend in the transverse direction of the vehicle to the two lateral edges 26 of the composite pane 2. In FIG. 3B, the transparent conductive traces 14 extend in the longitudinal direction of the vehicle to an upper edge 28 of the composite pane 2 arranged on the roof crossmember 6. In FIG. 3C, the transparent conductive traces 14 extend both in the transverse direction of the vehicle to the two lateral edges 26 and also in the longitudinal direction of the vehicle to a lower edge 27 of the composite pane 2 arranged on the frontal body section 9. In FIG. 3D, the transparent conductive traces 14 extend both in the transverse direction of the vehicle to the two lateral edges 26 and also obliquely to the longitudinal direction of the vehicle to the upper edge 28 of the composite pane 2.

As was already explained in connection with FIG. 2, the transparent conductive traces 14 serve for an electrical connection of the rain sensor 7 with the control device 24 for the transmission of the electrical signals for the automatic control of the windshield wiper system as a function of the degree of wetting of the outer surface 10 of the composite pane 2. The transparent conductive traces 14 serve furthermore for an electrical connection with a vehicle battery (not illustrated) for the supply of the rain sensor 7 with electrical power. As illustrated in connection with FIGS. 3A-3D, the respective course of the transparent conductive traces 14 can be adapted systematically to the position of the control device 24 or respectively vehicle battery, in order to keep the electrical connections as short as possible.

In the composite pane arrangement 1 according to the invention, the incident light beam 16 for detecting the wetting of the outer surface 10 of the outer pane 11 is coupled in directly into the outer pane 11, so that optical inhomogeneities of the inner pane 10 or respectively intermediate layer 13 cannot have an effect. The rain sensor 7 can be configured to be comparatively small, because the evaluation unit 25 is arranged outside the composite pane 2. By a course of the transparent conductive traces 14 which is able to be designed with a free choice, with said traces not impairing the clear visibility for the driver, short electrical connections can be realized between the rain sensor 7 and the evaluation unit 25 or respectively the vehicle battery.

While at least one exemplary embodiment has been presented in the foregoing summary and detailed description, it should be appreciated that a vast number of variations exist. It should also be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing an exemplary embodiment, it being understood that various changes may be made in the function and arrangement of elements described in an exemplary embodiment without departing from the scope as set forth in the appended claims and their legal equivalents.

The invention claimed is:

1. A composite pane arrangement for a motor vehicle, comprising:
   a first pane;
   a second pane forming a composite pane with the first pane;
   an intermediate layer of an adhesive polymer material that connects the first pane and the second pane, the intermediate layer having a first side coupled to the first pane and a second side coupled to the second pane; and
   an optical sensor device configured to optically detect moisture on an outer surface of the composite pane facing away from the intermediate layer, the optical sensor device arranged between the first pane and the second pane in a recess defined on the first side of the intermediate layer, and electrically contacted with substantially transparent and laminar conductive traces that are applied on the second side of the intermediate layer through contact pins that extend from the optical sensor to the conductive traces,
   wherein the recess is defined in a middle of the first side of the intermediate layer such that the optical sensor device is positioned in a middle of the composite pane arrangement.

2. The composite pane arrangement according to claim 1, further comprising an evaluation unit that is arranged outside the composite pane and configured to evaluate electronic signals of the optical sensor device.

3. The composite pane arrangement according to claim 1, wherein the substantially transparent and laminar conductive traces are guided to at least one of a side edge, a lower edge, and an upper edge of the composite pane.

4. The composite pane arrangement according to claim 1, wherein the optical sensor device is arranged in a vicinity of an interior rear-view mirror.

5. The composite pane arrangement according to claim 1, wherein the composite pane extends up to a roof crossmember connecting opposite B-columns of a vehicle body.

6. The composite pane arrangement according to claim 1, wherein the substantially transparent and laminar conductive traces are guided to a lower edge of the composite pane.

7. The composite pane arrangement according to claim 1, wherein the substantially transparent and laminar conductive traces are guided to an upper edge of the composite pane.

* * * * *